(12) United States Patent
Shionuma

(10) Patent No.: US 11,554,442 B2
(45) Date of Patent: Jan. 17, 2023

(54) ADDITIVE MANUFACTURING DEVICE AND ADDITIVE MANUFACTURING METHOD

(71) Applicant: IHI CORPORATION, Tokyo (JP)

(72) Inventor: Kenta Shionuma, Tokyo (JP)

(73) Assignee: IHI CORPORATION, Tokyo (JP)

( * ) Notice: Subject to any disclaimer, the term of this patent is extended or adjusted under 35 U.S.C. 154(b) by 381 days.

(21) Appl. No.: 16/652,851

(22) PCT Filed: Oct. 4, 2018

(86) PCT No.: PCT/JP2018/037231
§ 371 (c)(1),
(2) Date: Apr. 1, 2020

(87) PCT Pub. No.: WO2019/070032
PCT Pub. Date: Apr. 11, 2019

(65) Prior Publication Data
US 2020/0306867 A1    Oct. 1, 2020

(30) Foreign Application Priority Data

Oct. 6, 2017   (JP) .............................. JP2017-195817

(51) Int. Cl.
*B23K 9/04*        (2006.01)
*B23K 15/00*       (2006.01)
(Continued)

(52) U.S. Cl.
CPC ...... *B23K 15/0086* (2013.01); *B23K 15/0033* (2013.01); *B33Y 10/00* (2014.12); *B33Y 30/00* (2014.12); *B33Y 50/00* (2014.12)

(58) Field of Classification Search
CPC ............ B23K 15/0086; B23K 15/0033; B33Y 10/00; B33Y 30/00; B33Y 50/00;
(Continued)

(56) References Cited

U.S. PATENT DOCUMENTS 8,992,816 B2    3/2015   Jonasson et al.
9,782,933 B2 *  10/2017  Jonasson ................ B22F 12/00
(Continued)

FOREIGN PATENT DOCUMENTS

CN    105458260 A    4/2016
CN    106216676 A    12/2016
(Continued)

OTHER PUBLICATIONS

Steed et al., "Falcon: Visual analysis of large, irregularly sampled, and multivariate time series data in additive manufacturing", Computers and Graph I CS, ELS EV I ER, GB, vol. 6, p. 50-p. 64, XP029957254 (2017).

(Continued)

*Primary Examiner* — Zhipeng Wang
(74) *Attorney, Agent, or Firm* — Volpe Koenig

(57) ABSTRACT

An additive manufacturing device manufactures an additively manufactured article by preheating a powder material by irradiating the powder material with a charged particle beam and then melting the powder material by irradiating the powder material with the charged particle beam. The additive manufacturing device includes a beam emitting unit emitting the charged particle beam and irradiating the powder material with the charged particle beam, and a position detection unit detecting a position of scattering of the powder material when the powder material scatters by being irradiated with the charged particle beam. When the powder material scatters by being irradiated with the charged particle beam, the beam emitting unit emits the charged particle beam such that a thermal dose of the preheating is increased at the position of scattering.

9 Claims, 5 Drawing Sheets

(51) Int. Cl.
*B33Y 10/00* (2015.01)
*B33Y 30/00* (2015.01)
*B33Y 50/00* (2015.01)

(58) Field of Classification Search
CPC .......... B33Y 50/02; B22F 12/90; B22F 12/49; B22F 12/55; B22F 10/28; B22F 10/362; B22F 12/44; B22F 2999/00; B22F 2203/11; Y02P 10/25; B29C 64/153; B29C 64/264; B29C 64/393
See application file for complete search history.

(56) References Cited

U.S. PATENT DOCUMENTS

| | | | |
|---|---|---|---|
| 2010/0007062 A1* | 1/2010 | Larsson | B29C 64/153 264/485 |
| 2010/0163405 A1 | 7/2010 | Ackelid | |
| 2010/0270708 A1* | 10/2010 | Jonasson | B22F 10/20 264/401 |
| 2012/0211926 A1 | 8/2012 | Larsson et al. | |
| 2012/0234671 A1 | 9/2012 | Ackelid | |
| 2014/0370323 A1 | 12/2014 | Ackelid | |
| 2017/0014905 A1 | 1/2017 | Kawada et al. | |
| 2017/0095882 A1* | 4/2017 | Mireles | B33Y 10/00 |
| 2018/0071987 A1 | 3/2018 | Tsumuraya et al. | |
| 2020/0269345 A1* | 8/2020 | Yamada | B22F 10/85 |

FOREIGN PATENT DOCUMENTS

| | | |
|---|---|---|
| CN | 106346003 A | 1/2017 |
| JP | 2009-544501 A | 12/2009 |
| JP | 2010-526694 A | 8/2010 |
| JP | 2010-261072 A | 11/2010 |
| JP | 2011-052289 A | 3/2011 |
| JP | 2015-507092 A | 3/2015 |
| WO | 2009/084991 A1 | 7/2009 |
| WO | 2016/143137 A1 | 9/2016 |

OTHER PUBLICATIONS

Korner, "Additive manufacturing of metallic components by selective electron beam melting—a review", International Materials Reviews, vol. 61, No. 5, p. 361-p. 377, XP055314940 (2016).
Terrazas, University of Texas at El Paso DigitalCommons@UTEP, Open Access Theses & Dissertations, "Characterization of High-purity Niobium Structures Fabricated Using the Electron Beam Melting Process", Retrieved from the Internet: URL:https://scholarworks.utep.edu/cgi/view content.cgi?article=2359&context=open_etd [retrieved on Jun. 16, 2020], XP055705703 (2014).

* cited by examiner

… (1)

ADDITIVE MANUFACTURING DEVICE AND ADDITIVE MANUFACTURING METHOD

CROSS REFERENCE TO RELATED APPLICATION

This application is a national stage entry of International Patent Application No. PCT/JP2018/037231 filed on Oct. 4, 2018 and claims the benefit of priority of Japanese Patent Application No. 2017-195817 filed Oct. 6, 2017, the contents of which are all incorporated herein by reference in their entirety.

TECHNICAL FIELD

The present disclosure describes an additive manufacturing device and an additive manufacturing method for manufacturing an additively manufactured article.

BACKGROUND ART

An additive manufacturing device and an additive manufacturing method such as those disclosed in U.S. Pat. No. 8,992,816 are traditionally known. In this device and method, an additively manufactured article is manufactured by melting a powder material by irradiating the powder material with an electron beam and thereafter solidifying the same. In this device and method, a detector is installed near the surface of the powder material. The detector detects scattering of the powder material when the powder material is irradiated with the electron beam. That is, the detector detects a smoke phenomenon in which the scattered powder material rises as a mist. Moreover, this device and method prevent the article from being manufactured improperly by interrupting the electron beam irradiation when scattering of the powder material is detected.

CITATION LIST

Patent Literature

Patent Literature 1: U.S. Pat. No. 8,992,816

SUMMARY OF INVENTION

In such additive manufacturing device and method, the manufacturing operation is interrupted when the powder material scatters during the electron beam irradiation. When the manufacturing operation is interrupted, manufacturing of the article cannot proceed smoothly. Thus, when the manufacturing operation is interrupted, it may be resumed by starting the electron beam irradiation over from the beginning. However, the powder material may scatter again at the same irradiation position. In other words, the manufacturing of the article cannot be performed smoothly.

Therefore, a need has arisen in this technical field to develop an additive manufacturing device and an additive manufacturing method which can smoothly perform manufacturing of an article if the powder material scatters.

An additive manufacturing device according to an embodiment of the present disclosure is for manufacturing an additively manufactured article by preheating a powder material by irradiating the powder material with a charged particle beam and then melting the powder material by irradiating the powder material with the charged particle beam, the additive manufacturing device including a beam emitting unit emitting the charged particle beam and irradiating the powder material with the charged particle beam, and a position detection unit detecting a position of scattering of the powder material when the powder material scatters by being irradiated with the charged particle beam. The beam emitting unit is configured to emit the charged particle beam such that a thermal dose of the preheating is increased at the position of scattering when the powder material scatters by being irradiated with the charged particle beam.

This disclosure describes an additive manufacturing device that is capable of suppressing scattering of a powder material to smoothly perform manufacturing of an article if the powder material scatters.

DESCRIPTION OF EMBODIMENTS

Figure 1:
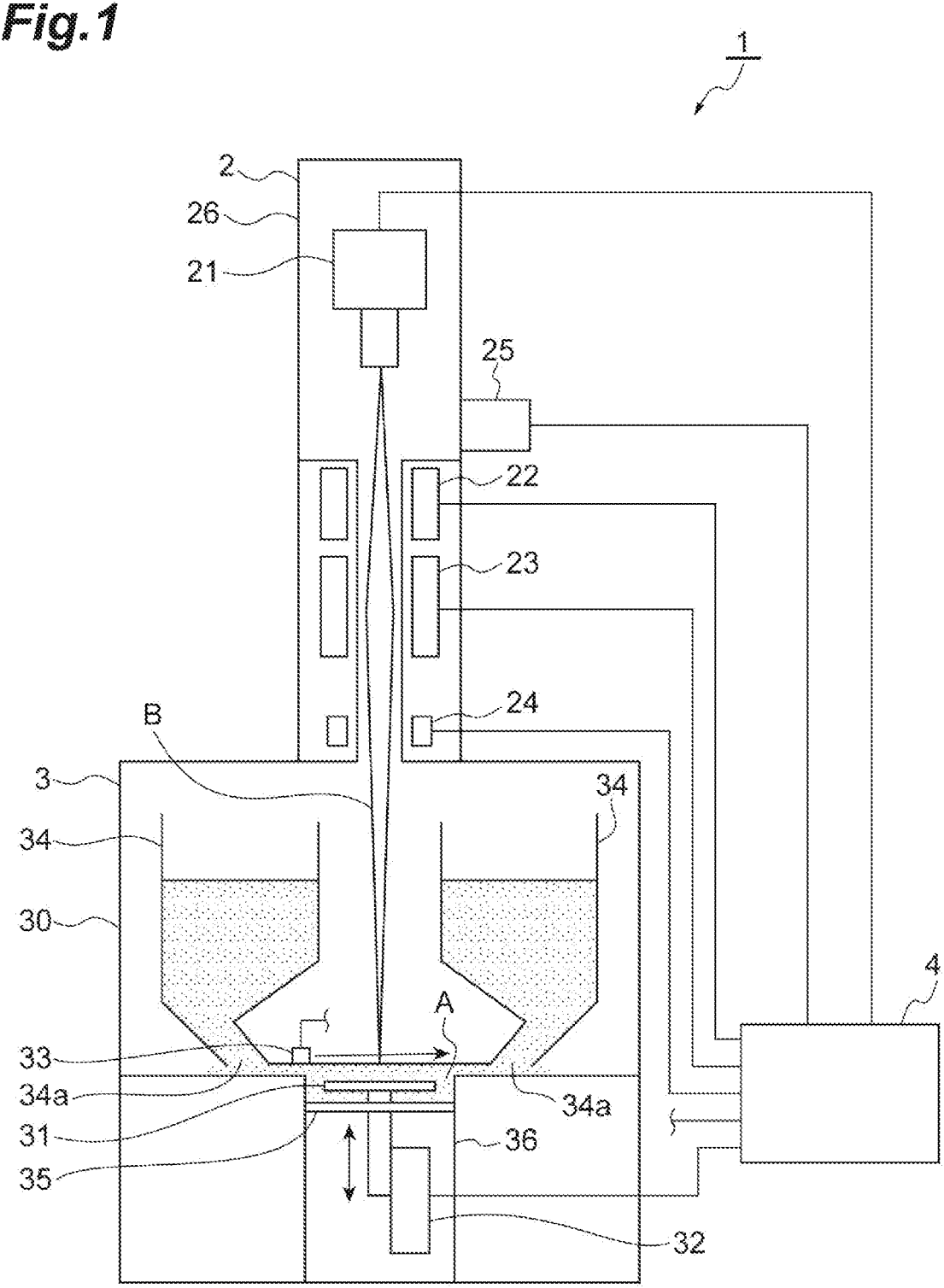
FIG. 1 is a schematic view of the configuration of an additive manufacturing device according to an embodiment of the present disclosure.

An additive manufacturing device according to an embodiment of the present disclosure is for manufacturing an additively manufactured article by preheating a powder material by irradiating the powder material with a charged particle beam and then melting the powder material by irradiating the powder material with the charged particle beam, the additive manufacturing device including a beam emitting unit emitting the charged particle beam and irradiating the powder material with the charged particle beam, and a position detection unit detecting a position of scattering of the powder material when the powder material scatters by being irradiated with the charged particle beam. The beam emitting unit is configured to emit the charged particle beam such that a thermal dose of the preheating is increased at the position of scattering when the powder material scatters by being irradiated with the charged particle beam. This additive manufacturing device increases the thermal dose of the preheating at the position at which scattering of the powder material has occurred when the powder material scatters by being irradiated with the charged particle beam. The position at which the scattering has occurred is sufficiently preheated due to the increase in the thermal dose. As a result, scattering of the powder material is suppressed. The additive manufacturing device is thus capable of smoothly performing the manufacturing of an article.

In the additive manufacturing device according to an embodiment of the present disclosure, when the powder material scatters by being irradiated with the charged particle beam, the beam emitting unit may emit the charged particle beam to an irradiation region of the charged particle beam and may additionally emit the charged particle beam to the position of scattering in the irradiation region, during the preheating. In this case, the additive manufacturing device additionally emits the charged particle beam to the position at which the scattering has occurred in the irradiation region during the preheating. As a result, the thermal dose of the preheating is increased at the position at which the scattering has occurred. Thus, the scattering of the powder material is suppressed, and the additive manufacturing device is capable of smoothly performing the manufacturing of an article.

In the additive manufacturing device according to an embodiment of the present disclosure, when the powder material scatters by being irradiated with the charged particle beam, the position detection unit may detect the position of scattering of the powder material based on a time at which the powder material scattered and a position of irradiation of the charged particle beam relative to a time of irradiation thereof. In this case, the additive manufacturing device is capable of detecting the position at which the scattering of the powder material has occurred without directly detecting the position at which the scattering of the powder material has occurred.

The additive manufacturing device according to an embodiment of the present disclosure may further include a scattering detection unit detecting an occurrence of scattering of the powder material, and the position detection unit may detect the position of scattering of the powder material when a signal indicating that scattering of the powder material has occurred is provided from the scattering detection unit.

An additive manufacturing method according to an embodiment of the present disclosure is for manufacturing an additively manufactured article by preheating a powder material by irradiating the powder material with a charged particle beam and then melting the powder material by irradiating the powder material with the charged particle beam, the additive manufacturing method including a position detection step of detecting a position of scattering of the powder material when the powder material scatters by being irradiated with the charged particle beam, and a preheating step of emitting the charged particle beam such that a thermal dose of the preheating is increased at the position of scattering when the powder material scatters by being irradiated with the charged particle beam. This additive manufacturing device increases the thermal dose of the preheating at the position at which scattering of the powder material has occurred when the powder material scatters by being irradiated with the charged particle beam. The position at which the scattering has occurred is sufficiently preheated due to the increase in the thermal dose. As a result, the powder material does not tend to be scattered. The additive manufacturing method is thus capable of smoothly performing the manufacturing of an article.

The additive manufacturing method according to an embodiment of the present disclosure may include a supplying step of supplying the powder material, to be performed before the position detection step, a manufacturing step of melting and solidifying the powder material by irradiating the powder material with the charged particle beam, to be performed before the position detection step and after the supplying step, a scattering detection step of detecting whether scattering of the powder material has occurred, to be performed before the position detection step and after the supplying step, and a step of further supplying additional powder material onto a portion of an article formed by the manufacturing step, to be performed after the detection step, wherein in the preheating step, the preheating may be performed by irradiating the additional powder material with the charged particle beam.

The additive manufacturing device and the additive manufacturing method according to an embodiment of the present disclosure will be described below with reference to the drawings. It should be noted that like elements are given like reference signs in the description of the drawings and redundant explanation is omitted.

FIG. 1 is a schematic view of the configuration of the additive manufacturing device according to an embodiment of the present disclosure. An additive manufacturing device 1 emits an electron beam B to a powder material A. The powder material A melts by being irradiated with the electron beam B and thereafter solidifies, so that an additively manufactured article is manufactured. The additive manufacturing device 1 repeats a step of preheating the powder material A by irradiating the powder material A with the electron beam B, and a step of melting the powder material A by irradiating the powder material A with the electron beam B to shape a portion of the article. By repeating these steps, the article is manufactured from the solidified powder material being stacked. Preheating is also referred to as preliminary heating. Preheating is a process of heating the powder material A prior to the manufacturing of the article. During the preheating, the powder material A is heated to a temperature less than a melting point of the powder material A. The powder material A is heated by the preheating and is thereby pre-sintered. This suppresses accumulation of negative charge on the powder material A due to the irradiation with the electron beam B. Thus, a smoke phenomenon in which the powder material A scatters and rises when irradiated with the electron beam B can be suppressed.

The additive manufacturing device 1 includes a beam emitting unit 2, a manufacturing unit 3, and a control unit 4. The beam emitting unit 2 emits the electron beam B to the powder material A in the manufacturing unit 3. The powder material A melts by being irradiated with the electron beam B. The electron beam B is a charged particle beam. The charged particle beam is formed by linear motion of electrons which are charged particles. The beam emitting unit 2 preheats the powder material A by irradiating the powder material A with the electron beam B. The beam emitting unit 2 melts the powder material A by irradiating the powder material A with the electron beam B after the preheating. An additively manufactured article is thus manufactured.

The beam emitting unit 2 includes an electron gun unit 21, an aberration coil 22, a focus coil 23, a deflection coil 24, and a scattering detector 25. The electron gun unit 21 is electrically connected to the control unit 4. The electron gun unit 21 operates on the basis of a control signal from the control unit 4. The electron gun unit 21 emits the electron beam B. The electron gun unit 21 emits the electron beam B, for example, downward. The aberration coil 22 is electrically connected to the control unit 4. The aberration coil 22 operates on the basis of a control signal from the control unit 4. The aberration coil 22 is installed around the electron beam B that is emitted from the electron gun unit 21. The aberration coil 22 corrects aberration of the electron beam B. The focus coil 23 is electrically connected to the control unit 4. The focus coil 23 operates on the basis of a control signal from the control unit 4. The focus coil 23 is installed around the electron beam B that is emitted from the electron gun unit 21. The focus coil 23 adjusts the state of focus of the electron beam B at a position of irradiation thereof by converging the electron beam B. The deflection coil 24 is electrically connected to the control unit 4. The deflection coil 24 operates on the basis of a control signal from the control unit 4. The deflection coil 24 is installed around the electron beam B that is emitted from the electron gun unit 21. The deflection coil 24 adjusts the position to be irradiated with the electron beam B on the basis of the control signal. The deflection coil 24 performs an electromagnetic beam deflection. A scan speed of the deflection coil 24 during the irradiation with the electron beam B is thus faster than a scan speed of a mechanical beam deflection. The electron gun unit 21, the aberration coil 22, the focus coil 23, and the deflection coil 24 are installed, for example, in a tubular column 26. It should be noted that installation of the aberration coil 22 may be omitted from the beam emitting unit 2.

The scattering detector 25 detects an occurrence of scattering of the powder material A caused by irradiation of the powder material A with the electron beam B. The phenomenon in which the powder material A rises as a mist due to scattering of the powder material A is called a smoke phenomenon. That is, the scattering detector 25 detects an occurrence of the smoke phenomenon during the irradiation of the powder material A with the electron beam B. An X-ray detector is used, for example, as the scattering detector 25. The scattering detector 25 which is an X-ray detector detects an X-ray that is generated when smoke is generated. The scattering detector 25 detects that scattering of the powder material A has occurred on the basis of the detection of the X-ray. The scattering detector 25 is, for example, attached to the column 26. The scattering detector 25 attached to the column 26 is disposed facing the electron beam B. It should be noted that the scattering detector 25 may be disposed proximate an irradiated region of the powdered material A.

The manufacturing unit 3 is a section that manufactures a desired article. The manufacturing unit 3 accommodates the powder material A in a chamber 30. The manufacturing unit 3 is disposed below the beam emitting unit 2. The manufacturing unit 3 includes the box-like chamber 30. The manufacturing unit 3 includes a plate 31, an elevator 32, a powder application mechanism 33, and a hopper 34. These components are arranged inside the chamber 30. The chamber 30 is connected to the column 26. An interior space of the chamber 30 is in communication with an interior space of the column 26 in which the electron gun unit 21 is disposed.

The plate 31 supports the article to be manufactured. The article is manufactured on the plate 31. The plate 31 supports the article as it is manufactured. The plate 31 is, for example, a circular plate-like body. The plate 31 is positioned in alignment with an emission direction of the electron beam B. The plate 31 is disposed, for example, oriented horizontally. The plate 31 is disposed so as to be supported by an elevating stage 35 that is installed therebelow. The plate 31 moves vertically with the elevating stage 35. The elevator 32 raises and lowers the elevating stage 35 and the plate 31. The elevator 32 is electrically connected to the control unit 4. The elevator 32 operates on the basis of a control signal from the control unit 4. For example, the elevator 32 moves the plate 31 upward together with the elevating stage 35 in an initial stage of the manufacturing of the article. The elevator 32 also lowers the plate 31 each time the powder material A is stacked by the melting and solidifying of the powder material A being repeated on the plate 31. The elevator 32 may be any mechanism that is capable of raising and lowering the plate 31.

The plate 31 is disposed inside a manufacturing tank 36. The manufacturing tank 36 is installed in a lower portion inside the chamber 30. The manufacturing tank 36 is, for example, cylindrical. The manufacturing tank 36 extends toward a direction of movement of the plate 31. The manufacturing tank 36 has a circular cross-sectional shape that is concentric with the plate 31. The shape of the elevating stage 35 conforms to an inner shape of the manufacturing tank 36. That is, when the inner shape of a horizontal cross section of the manufacturing tank 36 is circular, the elevating stage 35 is also circular. This shape facilitates preventing the powder material A supplied to the manufacturing tank 36 from falling below the elevating stage 35. Additionally, a sealing member may be disposed on an outer edge of the elevating stage 35 to prevent the powder material A from falling below the elevating stage 35. It should be noted that the shape of the manufacturing tank 36 is not limited to a cylindrical shape. The manufacturing tank 36 may, for example, be a rectangular tube which has a rectangular cross section.

The powder application mechanism 33 supplies the powder material A over the plate 31. The powder application mechanism 33 also levels the surface of the powder material A. The powder application mechanism 33 functions as a recoater. For example, a rod-like or plate-like member is used as the powder application mechanism 33. These members move in a horizontal direction. As a result, the powder material A is supplied to an irradiation region of the electron beam B and the surface of the powder material A is levelled. The movement of the powder application mechanism 33 is controlled by an actuator and a mechanism not shown. It should be noted that a mechanism that is different from the powder application mechanism 33 may be used as the mechanism for leveling the powder material A. The hopper 34 accommodates the powder material A. The hopper 34 has an outlet 34a for discharging the powder material A formed on a lower portion thereof. The powder material A discharged from the outlet 34a flows onto the plate 31. Alternatively, the powder material A is supplied onto the plate 31 by the powder application mechanism 33. The plate 31, the elevator 32, the powder application mechanism 33, and the hopper 34 are installed inside the chamber 30. The chamber 30 is in a vacuum or near vacuum state. It should be noted that a mechanism that is different from the powder application mechanism 33 and the hopper 34 may be used as the mechanism for supplying the powder material A onto the plate 31 in layers.

The powder material A is composed of numerous powders. For example, a metallic powder may be used as the powder material A. Grains having a particle size larger than powder may also be used as the powder material A if the grains can be melted and solidified by being irradiated with the electron beam B.

The control unit 4 which is an electronic control unit controls the entire additive manufacturing device 1. The control unit 4 includes a computer that has, for example, a CPU, a ROM, and a RAM. The control unit 4 controls raising and lowering of the plate 31, operation of the powder application mechanism 33, emission of the electron beam B, and operation of the deflection coil 24, and detects scattering of the powder material A and a position at which the scattering of the powder material A has occurred. To control the raising and lowering of the plate 31, the control unit 4 outputs a control signal to the elevator 32 to cause the elevator 32 to operate. As a result, the vertical position of the plate 31 is adjusted. To control the operation of the powder application mechanism 33, control unit 4 causes the powder application mechanism 33 to operate prior to the emission of the electron beam B. As a result, the powder material A is supplied onto the plate 31. The powder material A is also levelled. To control the emission of the electron beam B, the control unit 4 outputs a control signal to the electron gun unit 21 to cause the electron gun unit 21 to emit the electron beam B.

Figure 2:
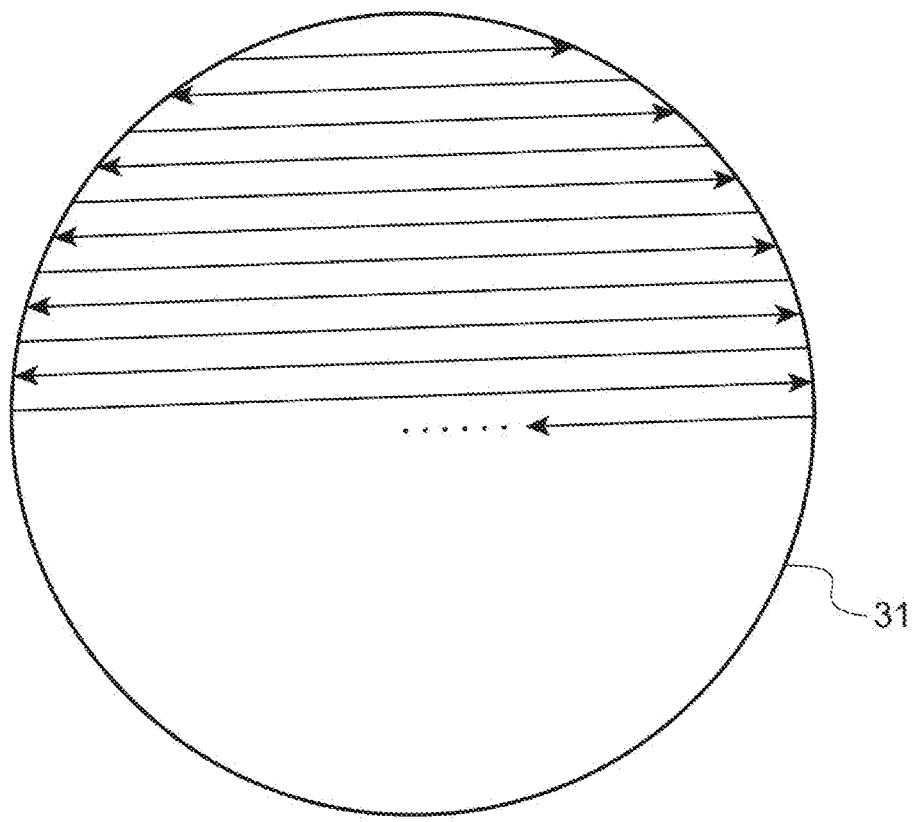
FIG. 2 is an illustrative view of preheating by the additive manufacturing device of FIG. 1.

To control the operation of the deflection coil 24, the control unit 4 outputs a control signal to the deflection coil 24. As a result, the position of irradiation of the electron beam B is adjusted. For example, when preheating the powder material A, the control unit 4 outputs a control signal to the deflection coil 24 of the beam emitting unit 2 and causes the electron beam B to be emitted such that electron beam B scans over the plate 31. For example, FIG. 2 shows the plate 31 as seen from above. As shown in FIG. 2, the control unit 4 controls the deflection coil 24 to cause the electron beam B to be emitted such that the position of irradiation of the electron beam B travels reciprocally from side to side. As a result, the powder material A of the entire surface of the plate 31 is evenly heated. The entire surface of the plate 31 may be irradiated with the electron beam B only once during the preheating. Alternatively, the irradiation with the electron beam B may be repeated a plurality of times during the preheating. The top surface of the plate 31 is a region for manufacturing the article. That is, the top surface of the plate 31 is the irradiation region of the electron beam B. It should be noted that FIG. 2 only shows the plate 31 and irradiation paths of the electron beam B for purposes of explanation. Illustration of the powder material A is accordingly omitted in FIG. 2. The plate 31 may be subjected to preheating. That is, during the preheating, the plate 31 may be irradiated with the electron beam B before the powder material A is supplied onto the plate 31.

Figure 3:
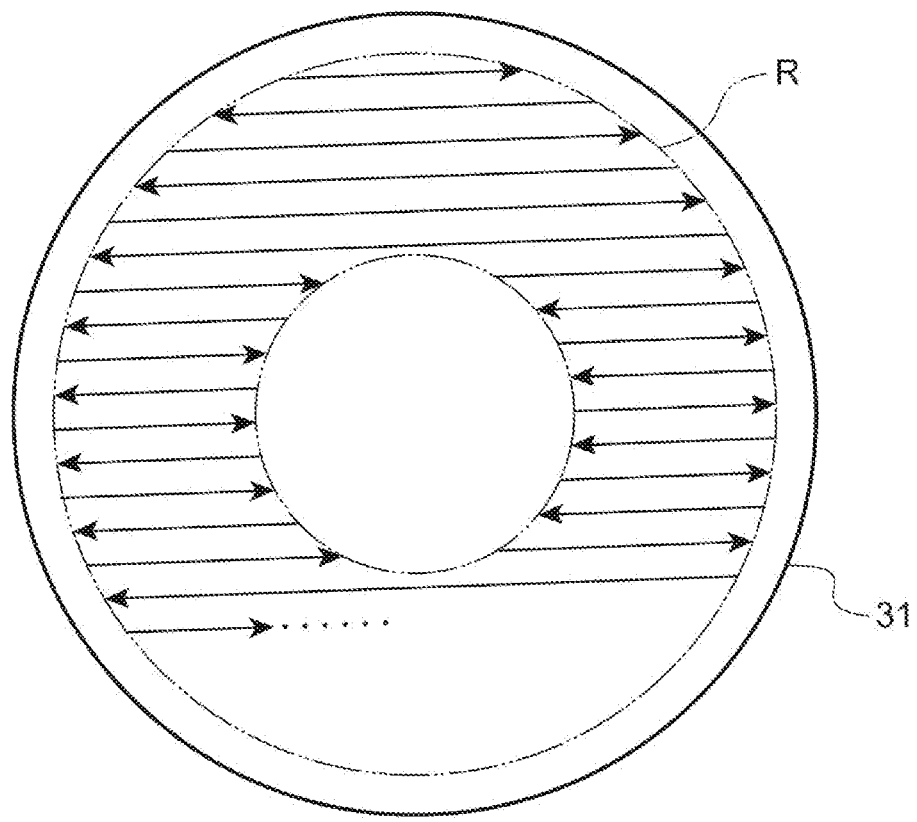
FIG. 3 is an illustrative view of the operation of manufacturing an article by the additive manufacturing device of FIG. 1.

When manufacturing an article, the control unit 4 uses, for example, three-dimensional computer-aided design (CAD) data of the article to be manufactured. The three-dimensional CAD data of an article is shape data of an article that is input in advance. The control unit 4 uses the three-dimensional CAD data to generate a collection of two-dimensional slice data. The collection of two-dimensional slice data is, for example, a plurality of pieces of data of horizontal sections corresponding to vertical positions of the article to be manufactured. The control unit 4 determines the region of the powder material A to be irradiated with the electron beam B on the basis of this slice data. The control unit 4 outputs a control signal to the deflection coil 24 according to the region. The control unit 4 outputs the control signal to the deflection coil 24 of the beam emitting unit 2 as shown in FIG. 3. As a result, an article region R corresponding to the shape of the article is irradiated with the electron beam B.

The control unit 4 detects that scattering of the powder material A has occurred. The control unit 4 functions as a scattering detection unit that detects that scattering of the powder material A has occurred when the powder material A is irradiated with the electron beam B. The scattering of the powder material A means the smoke phenomenon of the powder material A described above. In other words, whether the scattering of the powder material A has occurred or not means whether the smoke phenomenon has occurred or not. The control unit 4 detects whether the scattering of the powder material A has occurred or not on the basis of an output signal of the scattering detector 25. That is, the control unit 4 recognizes that scattering of the powder material A has occurred when the output signal of the scattering detector 25 includes a signal component indicating that scattering has occurred. The control unit 4 also stores information indicating that scattering has occurred.

The control unit 4 detects the position at which scattering of the powder material A has occurred. The control unit 4 functions as a position detection unit that detects the position at which scattering of the powder material A has occurred when scattering of the powder material A occurs due to the powder material A being irradiated with the electron beam B. For example, when the powder material A scatters by being irradiated with the electron beam B, the control unit 4 detects the position at which the scattering of the powder material A has occurred on the basis of the time at which the powder material A scattered and the position of irradiation of the electron beam B relative to the time of irradiation thereof. It should be noted that the time here may be the actual time. Alternatively, the time may be a local time set within the additive manufacturing device 1. Moreover, the time may be a duration of time from a predetermined start time such as the time at which the manufacturing of the article starts.

The control unit 4 recognizes the position of irradiation of the electron beam B relative to the time of irradiation of the electron beam B on the basis of the control signal to the beam emitting unit 2. The control unit 4 is thus capable of detecting the position at which scattering of the powder material A has occurred on the basis of the time at which scattering of the powder material A has occurred. Such operation of detecting the position at which scattering occurs enables the position at which scattering of the powder material A has occurred to be calculated without directly detecting the position at which scattering of the powder material A has occurred. It thus eliminates the need to install a camera, a sensor, or the like that directly detect the state of occurrence of scattering of the powder material A. It should be noted that imaging information from a camera may be used for the operation to detect the occurrence of scattering and the operation to detect the position at which scattering has occurred. For example, the occurrence of scattering and the position at which scattering has occurred may be detected by detecting the position in which the powder material A is missing from the imaging information.

Figure 4:
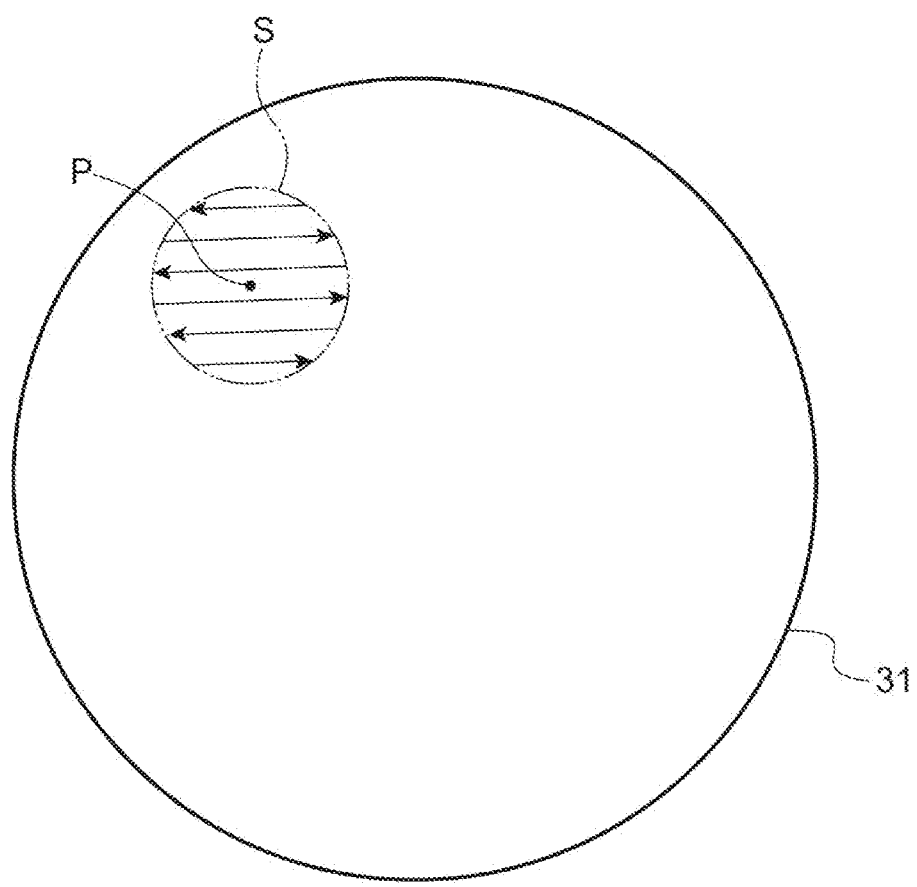
FIG. 4 is an illustrative view of an increase in thermal dose of the preheating by the additive manufacturing device of FIG. 1.

The control unit 4 controls irradiation of the electron beam B conditioned on the occurrence of scattering of the powder material caused by irradiation with the electron beam B. Specifically, to control the irradiation, the control unit 4 increases a thermal dose of the preheating at the position at which scattering has occurred. For example, the powder material A may scatter due to irradiation with the electron beam B during the manufacturing of an article. When scattering occurs, the control unit 4 controls the irradiation of the electron beam B such that the beam emitting unit 2 increases the thermal dose of the preheating in the next preheating. For example, the control unit 4 causes the beam emitting unit 2 to emit the electron beam B to the irradiation region of the electron beam B during the preheating. Furthermore, during the preheating, the control unit 4 causes the beam emitting unit 2 to additionally emit the electron beam B to the position at which scattering has occurred within the irradiation region. Specifically, the control unit 4 causes the entire irradiation region of the plate 31 to be irradiated with the electron beam B, as shown in FIG. 2, during the preheating. After the irradiation with the electron beam B, the control unit 4 additionally causes a scattering occurrence position P to be irradiated with the electron beam B as shown in FIG. 4. In this case, a scattering occurrence region S that is set within a predetermined distance from the scattering occurrence position P is subjected to additional preheating.

An operation of the additive manufacturing device 1 and the additive manufacturing method according to the present embodiment will next be described.

Figure 5:
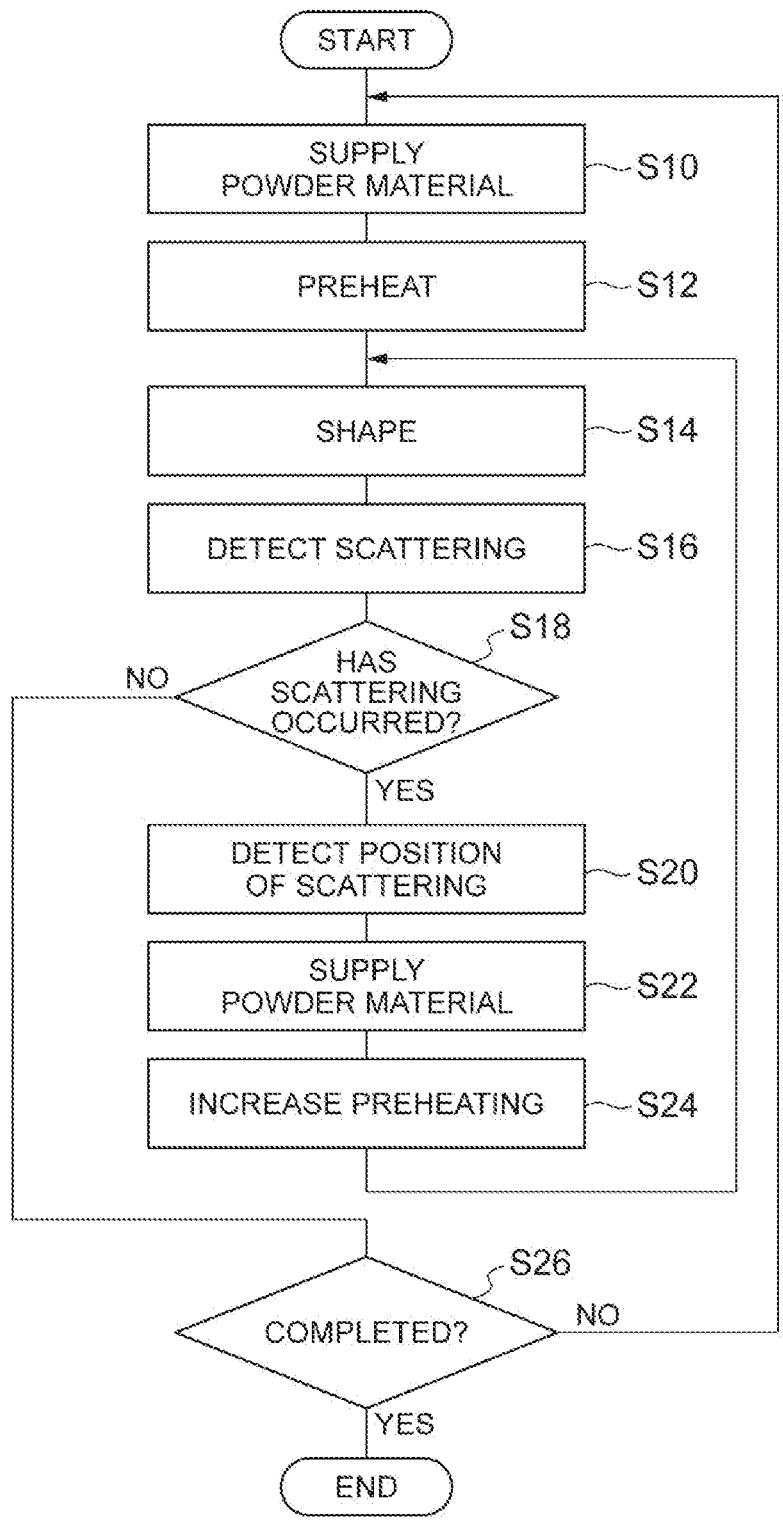
FIG. 5 is a flow chart showing the operation of the additive manufacturing device and the additive manufacturing method according to an embodiment of the present disclosure.

FIG. 5 is a flow chart showing the operation of the additive manufacturing device 1 and the additive manufacturing method according to the present embodiment. The series of control processes of FIG. 5 is performed, for example, by the control unit 4. In the operation of the additive manufacturing device 1 and the additive manufacturing method according to the present embodiment, preheating of the powder material A and manufacturing of the article are repeated by the powder material A being irradiated with the electron beam B to manufacture the article in a stacked manner. When the powder material A scatters due to the powder material A being irradiated with the electron beam B, the position at which the powder material A scattered is detected. The electron beam B is then emitted such that the thermal dose of the preheating is increased at the position at which the scattering has occurred. The position at which the scattering has occurred is sufficiently preheated due to this increase in the thermal dose of the preheating. As a result, the occurrence of scattering of the powder material is suppressed. The operation of the additive manufacturing device 1 and the additive manufacturing method according to the present embodiment will be specifically described below with reference to FIG. 5.

As indicated in step S10 (supplying step) of FIG. 5, the powder material A is supplied. It should be noted that step S10 will simply be referred to as "S10" in the description below. The steps after step S10 will also be referred to in a similar manner. Supplying of the powder material A includes supplying the powder material A to an irradiation region of the electron beam B and levelling the surface of the powder material A. For example, in FIG. 1, the control unit 4 outputs a control signal to the elevator 32 to adjust the vertical position of the plate 31. The control unit 4 also outputs a control signal to an actuator or a mechanism not shown to cause the powder application mechanism 33 to operate. These actions cause the powder application mechanism 33 to operate in the horizontal direction. Additionally, the powder material A is supplied onto the plate 31 and the surface of the powder material A is levelled.

The process transfers to S12 (preheating step) shown in FIG. 5. In S12, a preheating process is performed. In the preheating process, the powder material A is heated in advance before the manufacturing of an article. The control unit 4 outputs a control signal to the beam emitting unit 2. The control unit 4 causes the electron beam B to be emitted from the electron gun unit 21 and scans the electron beam B. These actions cause the powder material A on the plate 31 to be irradiated uniformly with the electron beam B as shown in FIG. 2. The powder material A is heated as a result.

The process transfers to S14 (manufacturing step). In S14, a manufacturing process is performed. In the manufacturing process, an article is manufactured. For example, the control unit 4 generates two-dimensional slice data on the basis of three-dimensional CAD data of the article to be manufactured. The control unit 4 determines a region of the powder material A to be irradiated with the electron beam B on the basis of this slice data. The control unit 4 then causes the beam emitting unit 2 to emit the electron beam B according to the determined region. As a result, a portion of the layers that form the article is manufactured in the manufacturing process (S14).

The process transfers to S16 (scattering detection step). In S16, a process of detecting scattering is performed. In the process of detecting scattering, it is detected whether scattering of the powder material A has occurred due to the powder material A being irradiated with the electron beam B. The control unit 4 detects whether scattering of the powder material A has occurred on the basis of an output signal of the scattering detector 25. The process then transfers to S18 and the control unit 4 determines whether scattering of the powder material A has occurred. If it is determined in S18 that scattering of the powder material A has not occurred, the process transfers to S26.

However, if it is determined in S18 that scattering of the powder material A has occurred, a process of detecting the position at which the scattering has occurred is performed (S20: position detection step). In the process of detecting the position at which the scattering has occurred, the position at which the scattering of the powder material A has occurred is detected in the irradiation region of the electron beam B. For example, the control unit 4 detects the position at which the scattering of the powder material A has occurred on the basis of the time at which the scattering of the powder material A occurred and the position of irradiation of the electron beam B relative to the time of irradiation thereof. The control unit 4 recognizes the position of irradiation of the electron beam B relative to the time of irradiation of the electron beam B on the basis of the control signal to the beam emitting unit 2. The control unit 4 is thus capable of detecting the position at which the scattering of the powder material A has occurred on the basis of the time at which the scattering occurred. The control unit 4 also sets the scattering occurrence region S on the basis of the scattering occurrence position P as shown in FIG. 4. The scattering occurrence region S is set as a region that is within a predetermined distance from the scattering occurrence position P. It should be noted that S14, S16, and S18 may be performed in parallel. That is, while irradiating the powder material A with the electron beam B for melting, the occurrence of scattering of the powder material A that may be caused by the irradiation with the electron beam B may be detected (S16, S18).

The process transfers to S22 shown in FIG. 5. In S22, a process of supplying the powder material A is performed. In the process of supplying the powder material A, the powder material A is supplied to the irradiation region of the electron beam B. Additionally, in the process of supplying the powder material A, the surface of the supplied powder material A is levelled. The supplying process of S22 is the same as the supplying process of S10 described above.

The process then transfers to S24. In S24, a process of increasing the thermal dose of preheating is performed. In the process of increasing the thermal dose of preheating, the powder material A is heated in advance before the manufacturing of the article, more specifically, in S24, the powder material A is further heated such that the thermal dose is increased compared to the thermal dose in the previously performed preheating process of S12. For example, during the preheating, the control unit 4 causes the beam emitting unit 2 to emit the electron beam B to the irradiation region of the electron beam B. The control unit 4 also causes the electron beam B to be additionally emitted to the scattering occurrence position P in the irradiation region. Specifically, during the preheating, the control unit 4 causes the entire irradiation region of the plate 31 to be irradiated with the electron beam B as shown in FIG. 2. Thereafter, the control unit 4 causes the scattering occurrence region S that includes the scattering occurrence position P to be additionally irradiated with the electron beam B as shown in FIG. 4. The control unit 4 performs the process of S14 again after the process of increasing the thermal dose of preheating of S24 is completed.

If it is determined in S18 that scattering of the powder material A has not occurred, the control unit 4 determines whether a termination condition of the control processes is satisfied (S26). The termination condition of the control processes is satisfied, for example, when the manufacturing of a desired additive manufactured article is completed. That is, the termination condition of the control processes is satisfied when the manufacturing of the article is completed as a result of repeating the control processes S10 to S24. The termination condition of the control processes is not satisfied, for example, when the manufacturing of the desired additive manufactured article is not completed.

If it is determined in S26 that the termination condition of the control processes is not satisfied, the control unit 4 performs the processes S10 to S26 again. However, if it is determined in S26 that the termination condition of the control processes is satisfied, the control unit 4 terminates the series of control processes shown in FIG. 5.

The article is thus gradually formed in layers by the processes S10 to S26 shown in FIG. 5 being repeated. As a result, the desired article is ultimately manufactured.

As described above, the additive manufacturing device and the additive manufacturing method according to the present disclosure increase the thermal dose of the preheating at the scattering occurrence position P when the powder material A scatters by being irradiated with the electron beam B. The scattering occurrence position P is thus sufficiently preheated, so that scattering of the powder material A is suppressed. Consequently, the additive manufacturing device and the additive manufacturing method according to the present disclosure are capable of smoothly performing the manufacturing of an article.

The additive manufacturing device and the additive manufacturing method according to the present disclosure irradiate the irradiation region of the electron beam B with the electron beam B during the preheating. The additive manufacturing device and the additive manufacturing method also additionally irradiate the scattering occurrence position P in the irradiation region with the electron beam B. The thermal dose of the preheating can thus be increased in the scattering occurrence position P. Consequently, scattering of the powder material A is suppressed, and the additive manufacturing device and the additive manufacturing method are capable of smoothly performing the manufacturing of an article.

When the powder material A scatters by being irradiated with the electron beam B, the additive manufacturing device and the additive manufacturing method according to the present disclosure detect the position at which scattering of the powder material A has occurred on the basis of the time at which the powder material A scattered and the position of irradiation of the charged particle beam relative to the time of irradiation thereof. The additive manufacturing device and the additive manufacturing method are thus capable of detecting the scattering occurrence position P of the powder material A without directly detecting the position at which the scattering of the powder material A has occurred.

It should be noted that the additive manufacturing device according to the present disclosure is not limited to the embodiment described above. Various modifications of the additive manufacturing device according to the present disclosure may be made without departing from the gist of the claims.

For example, the embodiment above describes manufacturing an article by irradiating the powder material A with the electron beam B as the charged particle beam. However, the additive manufacturing device may emit a charged particle beam that is different from the electron beam B. For example, the additive manufacturing device may manufacture an article by emitting an ion beam.

REFERENCE SIGNS LIST

1 Additive manufacturing device
2 Beam emitting unit
3 Manufacturing unit
4 Control unit (Position detection unit)
21 Electron gun unit
22 Aberration coil
23 Focus coil
24 Deflection coil
25 Scattering detector
31 Plate
32 Elevator
33 Powder application mechanism
34 Hopper
A Powder material
B Electron beam
P Scattering occurrence position
R Article region
S Scattering occurrence region

The invention claimed is:

1. An additive manufacturing device for manufacturing an additively manufactured article by preheating a powder material by irradiating the powder material with a charged particle beam and then melting the powder material by irradiating the powder material with the charged particle beam, the additive manufacturing device comprising:
a beam emitting unit emitting the charged particle beam and irradiating the powder material with the charged particle beam; and
a position detection unit detecting a position of scattering of the powder material when the powder material scatters by being irradiated with the charged particle beam,
wherein when the powder material scatters by being irradiated with the charged particle beam, the beam emitting unit emits the charged particle beam such that a thermal dose of the preheating is increased at the position of scattering and a position of irradiation of the charged particle beam travels reciprocally from side to side.

2. The additive manufacturing device according to claim 1, wherein when the powder material scatters by being irradiated with the charged particle beam, the beam emitting unit emits the charged particle beam to an irradiation region of the charged particle beam and additionally emits the charged particle beam to the position of scattering in the irradiation region, during the preheating.

3. The additive manufacturing device according to claim 1, wherein when the powder material scatters by being irradiated with the charged particle beam, the position detection unit detects the position of scattering of the powder material based on a time at which the powder material scattered and a position of irradiation of the charged particle beam relative to a time of irradiation thereof.

4. The additive manufacturing device according to claim 1, further comprising a scattering detection unit detecting an occurrence of scattering of the powder material, and
wherein the position detection unit detects the position of scattering of the powder material when a signal indicating that scattering of the powder material has occurred is provided from the scattering detection unit.

5. An additive manufacturing method for manufacturing an additively manufactured article by preheating a powder material by irradiating the powder material with a charged particle beam and then melting the powder material by irradiating the powder material with the charged particle beam, the additive manufacturing method comprising:

a position detection step of detecting a position of scattering of the powder material when the powder material scatters by being irradiated with the charged particle beam, and a preheating step of emitting the charged particle beam such that a thermal dose of the preheating is increased at the position of scattering and a position of irradiation of the charged particle beam travels reciprocally side to side, when the powder material scatters by being irradiated with the charged particle beam.

6. The additive manufacturing method according to claim 5, comprising:

a supplying step of supplying the powder material, to be performed before the position detection step;

a manufacturing step of melting and solidifying the powder material by irradiating the powder material with the charged particle beam, to be performed before the position detection step and after the supplying step;

a scattering detection step of detecting whether scattering of the powder material has occurred, to be performed before the position detection step and after the supplying step; and a step of further supplying additional powder material onto a portion of an article formed by the manufacturing step, to be performed after the detection step, wherein in the preheating step, the preheating is performed by irradiating the additional powder material with the charged particle beam.

7. The additive manufacturing device according to claim 2, wherein when the powder material scatters by being irradiated with the charged particle beam, the position detection unit detects the position of scattering of the powder material based on a time at which the powder material scattered and a position of irradiation of the charged particle beam relative to a time of irradiation thereof.

8. The additive manufacturing device according to claim 2, further comprising a scattering detection unit detecting an occurrence of scattering of the powder material, and wherein the position detection unit detects the position of scattering of the powder material when a signal indicating that scattering of the powder material has occurred is provided from the scattering detection unit.

9. The additive manufacturing device according to claim 3, further comprising a scattering detection unit detecting an occurrence of scattering of the powder material, and wherein the position detection unit detects the position of scattering of the powder material when a signal indicating that scattering of the powder material has occurred is provided from the scattering detection unit.

* * * * *